Patented May 13, 1952

2,596,659

UNITED STATES PATENT OFFICE 2,596,659

METHOD OF MAKING CELLULAR GLASS HAVING INTERCOMMUNICATING CELLS

Dominic D'Eustachio, Port Allegany, Pa., assignor to Pittsburgh Corning Corporation, Allegheny County, Pa., a corporation of Pennsylvania No Drawing. Application May 13, 1949, Serial No. 93,178

7 Claims. (Cl. 49—77)

The present invention relates to the treatment of cellular materials and it has particular relation to the treatment of cellular glass as obtained by heating a mixture of finely pulverized glass and a gassing agent or mixture of gassing agents in order to sinter the particles of glass into a continuous phase and to generate bubbles of gas therein by reason of decomposition or reaction of the gassing agent or agents.

One object of the invention is to provide cellular glass in which there is intercommunication between the individual cells.

A second object of the invention is to provide cellular glass bodies of substantial thickness in which there is intercommunication uniformly throughout the cellular structure.

A third object of the invention is to provide cellular glass bodies having relatively uniform cell structure in which there is ready communication between the individual cells.

A fourth object of the invention is to provide cellular glass bodies having uniform cells with intercommunication between individual cells, which body possesses a relatively high degree of mechanical strength.

A fifth object of the invention is to provide cellular glass having intercommunication between the individual cells, which body is adapted for such uses as a sound-absorbing facing for building walls, as a filtering medium, as a retainer for liquids, adapting the bodies for such purposes as securing blocks, humidifiers, deodorizing bodies and the like.

A sixth object of the invention is to provide a simple and convenient method of preparing products of the above described character.

These and other objects of the invention will be apparent from consideration of the following specification and claims.

It has been heretofore proposed to provide light weight cellular bodies of glass by a number of different methods. For example, it has been proposed to inject air or other gas in a body of molten glass in such manner as to obtain as uniform distribution of the gases as bubbles in the bodies as possible. It has also been proposed to subject molten glass containing absorbed gases or gas-producing materials to reduced pressure whereby to cause the gases to be released as bubbles in the glass. Still another method in this same group involved the incorporation of a gas-producing agent, such as pulverized silicon carbide, into molten glass whereby reaction between the glass constituents and the pulverized materials occurred to liberate bubbles of gas in situ.

Another previously known method of forming cellular glass comprised the incorporation of an appropriate gas-producing agent such as finely powdered calcium carbonate, or a mixture of finely pulverized carbonaceous material, e. g. carbon black, and an oxygen-producing agent, such as salt cake, calcium sulphate, or antimony trioxide, adapted to react with the carbonaceous material to form gases, into finely pulverized glass. A mixture of this type could be heated to the sintering point of the glass whereby to obtain a continuous, coherent mass in which the gas-producing agents could react to generate bubbles in relatively uniform dispersion and size. A method of this general character is disclosed in U. S. Patent 2,123,536 to Bernard Long. This latter method is the most satisfactory thus far developed, since it results in production in which the cellularity is high and is also comparatively uniform as to cell size and distribution. Furthermore, the cells are usually of relatively small size, which is highly desirable.

The products as thus prepared have heretofore embodied sealed cells which rendered the product quite useful as a medium for insulation or as a low density material suitable for use as a buoyant medium for life rafts, floats for nets and many other similar purposes. However, the closed cell structure obviously is not well adapted for such applications as sound absorption or in the provision of filter plates or absorption agents for liquids and gases.

The present invention contemplates the provision of a simple and convenient method of obtaining intercommunication in the cell structure, adapting the material for the latter described applications and many other applications based upon similar properties of the material. The invention essentially resides in the discovery that if a cellular glass of the type above described and having closed cell structure is subjected to fluid pressure the thin walls of the cells, at their weakest points, tend to rupture in such manner as to permit communication between cells but without breaking down the bodies or materially impairing their mechanical strength.

The invention can be applied to any cellulated glass of low density and having sealed cells; all of the methods of preparing cellular glass are contemplated. However, it is particularly adapted for use in connection with the product as prepared by the method described in the Long patent or by refinements of the method of the latter patent. For example, a product suitable for use in the practice of the invention may be readily prepared by admixing pulverized glass, e. g. a lime soda glass similar to window glass or a glass of similar character but containing a large amount of boron in the form of borax or the like, with a gassing agent, and partially fusing the mixture.

Calcium carbonate in finely pulverulent state and in an amount of say ½% or 1% up to about 2% might be employed as the gassing agent. Carbon black, lamp black or similar black and an oxygen supplying agent are to be preferred, however. A black is employed, for example, in a proportion of .1 up to about 1%, e. g. approximately .2%. It preferably is incorporated into glass containing considerable residual $SO_3$ or $SO_2$, or sulphate in the form of calcium sulphate; or sodium sulphate can be added in an amount, for example, of .1 to .8% or thereabouts. The sulphate constitutes a source of oxygen which the carbon can take up by reduction reaction to liberate carbon monoxide and various sulphur gases. Antimony trioxide in small amount, e. g. .1 to 3%, can be substituted for sulphate.

The glass preferably is very finely pulverized, e. g. to a mesh of 200 to 400 or even finer. The glass and the added ingredients should be admixed as thoroughly and uniformly as possible. The mixture is introduced into a closed mold of refractory material in an amount, for example, approximately ½ or ⅓, to fill the mold chamber. The mixture is then heated in a suitable furnace to sinter the glass and then to soften the coherent mass. The temperature preferred for most glass will be within a range of about 1400 to 1700° F. The mixture is held in the mold at the foregoing temperatures until the mass sinters and bloats, to fill the mold. This will usually occur within a period of 2 to 4 hours.

After the bodies are formed and cellulated, they may be annealed in the mold or they may be removed from the molds and annealed separately. Since the bodies are of very low thermal conductivity, the annealing operation usually requires considerable time, e. g. a period of 15 or 20 hours or even longer depending somewhat upon the thickness of the mass to be annealed. Annealing, of course, is conducted in the usual manner by cooling the glass very gradually from a point above its critical value or annealing point to a point below the latter value and finally down to room temperature.

The bodies, as obtained by the foregoing method, will usually be covered by a skin of relatively dense impermeable material and the interiors of the bodies will be composed of a large mass of bubbles or cells which are quite uniformly closed in such manner as to retain the gases in the cells and to prevent permeation of gases and liquids from the exterior into the cells. The bubbles tend to assume polyhedral section and the sides of the polyhedrons are quite thin and are shared with the adjacent bubbles or cells. The middle of each wall presumably constitutes a point of weakness. The density of the bodies will be very low, usually within a range of .1 to .2 or .25 dependent upon the technique employed in effecting the cellulation. About .15 would appear to be a good average density for the material. For purposes of the present invention, it is preferred to cut away the outer skin surface of the bodies and to cut them to the desired shape, for example, to the form of blocks or slabs. It is also permissible to shape them into cylinders or other appropriate forms.

Bodies so formed are ready for treatment in accordance with the provisions of the present invention in order to provide intercommunication between cell walls. This operation is performed by placing the bodies in suitable closed chambers and then subjecting them to fluid pressure. The fluid may be air or other gaseous medium or it may be a liquid. Pressure is usually brought up rather slowly in order to permit the medium to permeate from cell to cell completely through the bodies without the external pressure becoming so great as to crush the interior cell structure before the gases can permeate into them to establish equilibrium. The gases apparently break through the cell walls at the points where they are thinnest thus establishing equilibrium between the exteriors and the interiors of the cells without doing further damage to the cell structure. Ultimately the gaseous medium will permeate from cell to cell inwardly, completely through the bodies opening up practically all the cells to provide thorough intercommunication but without appreciably impairing the mechanical strength of the resultant products. The units can still be cut, nailed and otherwise handled in the same manner as ordinary cellular slabs.

The pressure upon thick, massive bodies should be brought up more slowly than upon thin bodies. Obviously there is no minimum rate of increasing the pressure; but excessively slow rates are time consuming. A time period of 1 to 20 minutes for attaining maximum pressure would cover most operations. This may be followed by a hold period of any desired length.

The pressure ultimately attained in treating the bodies, of course, will depend somewhat upon the density of the material treated. Thus material having strong cell walls, of course, may require higher pressures than low density materials in which the walls are very thin. Usually a pressure up to about 1400 or 1500 pounds per square inch is quite adequate and lower pressures are contemplated. Any pressure that will break through the cell walls is within the purview of the invention. In some instances, pressures of 200, 300, 400, 500, 600, 700, 800 or 900 pounds may be adequate.

After the maximum pressure is attained, it is convenient to allow the bodies to remain under pressure for a few minutes, e. g. 10 or 15 minutes, in order to assure that complete penetration has been obtained. There, of course, is no upper limit to the period in which pressure may be maintained since after equilibrium is attained throughout the cellular bodies, further rupture of the cell walls ceases.

Each open cell will have communication through one or more channels with the surface. Doubtless, the channels in the interior are highly tortuous and have many enlargements formed by the communicating cells. The cells and passages thus provide an enormous specific surface, and also the bodies can retain very large volumes of liquids and gases.

The resultant bodies, as previously stated, retain their mechanical strength and can be cut, nailed or otherwise manipulated as if untreated. However, the gases contained in the cells, and usually containing carbon oxides and sulphur gases, are expelled or largely expelled. The resultant product will retain its thermal insulating properties at least so long as the cell structure is not charged with a liquid. Slabs of the material can be anchored on ceilings and walls as a sound absorbing medium. The structures can be employed as filter plates through which liquids can be forced for removing solids. They will also retain suspended material in gases. Furthermore, they can be charged with liquids containing soaps and other detergents for purposes of providing scouring bricks or similar articles. It is also contemplated to charge the bodies with such liquids as deodorants, disinfectants, perfumes and the like. The bodies so charged will act slowly and will be serviceable for long periods of time. The bodies may also be charged with a liquid such as water and employed as moisture supplying agents in humidifiers of various types. The use of a gaseous pressure medium has been described. Liquids such as water may be substituted for gases.

The use of powdered glass in forming bodies suitable for cellulation and subsequent pressure treatment to open the cells has been described. It is also contemplated to substitute powdered minerals such as feldspar, nepheline, syenite, spodumene or the like for powdered glass. The minerals may also be mixed into powdered glass in an amount for example of 1% to 40% or more. These minerals, of course, are incorporated with gassing agents, e. g. carbon black and an oxygen supplying agent such as calcium sulphate or salt cake. The mixture containing the minerals should be heated until the mass becomes plastic and bloats. The bloated mass may be annealed.

Cellulated slags such as blast furnace slags constitute the subject matter of numerous patents. It is contemplated that these slags may be appropriately treated by fluid pressure to impart communication between cells.

The forms of the invention herein described are by way of illustration only. It will be apparent to those skilled in the art that various modifications may be made therein without departure from the spirit of the invention or the scope of the appended claims.

I claim:

1. A method of treating an annealed frangible cellular material in which the cells are closed in order to open communication between cells, which comprises subjecting the surfaces of the material to fluid pressure to progressively break passages therethrough from cell to cell throughout the material without otherwise breaking down the structure.

2. A method of providing cellular glass bodies having intercommunicating cells, which method comprises shaping a slab of annealed cellular glass having closed abutting cells into a body of the desired contour, and subjecting the exterior surfaces of the body to fluid pressure in order to progressively rupture the cell walls at their weakest points from the surface to the interior of the body without otherwise impairing the structure of the body.

3. A method of providing cellular glass bodies having intercommunicating cells, which method comprises shaping a body of cellular glass having closed abutting cells to the desired surface contour, and exposing the surfaces of the body to fluid pressure of sufficient magnitude to rupture the cell walls progressively from the surface to the interior of the body as the pressure permeates the body through the previously ruptured cell walls.

4. A method of treating cellular glass bodies comprised of closed abutting cells to provide substantially complete communication between the cells thereof, which method comprises the steps of placing the body in a suitably closed chamber, producing gradually increasing fluid pressure within the chamber to a maximum depending upon the density of the cellular glass, then releasing the pressure and removing the body.

5. The process as in claim 4 in which the pressure after reaching maximum is maintained for an interval sufficient to provide substantial equilibrium of pressure within the body.

6. The process as in claim 4 in which the body, before being placed in the chamber, is suitably machined to rupture the exterior cell structure on at least one surface thereof.

7. A method of providing cellular glass bodies having intercommunicating cells, from a previously formed annealed cellular body having abutting closed cells, which method comprises shaping the previously formed body into the desired contour and subjecting the body to gradually increasing fluid pressure for progressively rupturing the cell walls inwardly from the body surfaces without otherwise substantial impairment of the mechanical strength of the body.

DOMINIC D'EUSTACHIO.

REFERENCES CITED

The following references are of record in the file of this patent:

UNITED STATES PATENTS

| Number | Name | Date |
| --- | --- | --- |
| 2,114,546 | Slayter | Apr. 19, 1938 |
| 2,237,032 | Haux | Apr. 1, 1941 |
| 2,369,057 | Leary et al. | Feb. 6, 1945 |